United States Patent
Suh (10) Patent No.: US 8,892,122 B2
(45) Date of Patent: Nov. 18, 2014

(54) TRANSMITTING AND RECEIVING APPARATUSES AND METHODS USING A DIFFERENTIAL CYCLIC DELAY DIVERSITY MIMO SCHEME

(75) Inventor: Sungjin Suh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 434 days.

(21) Appl. No.: 13/375,194

(22) PCT Filed: May 28, 2010

(86) PCT No.: PCT/KR2010/003395
§ 371 (c)(1),
(2), (4) Date: Nov. 29, 2011

(87) PCT Pub. No.: WO2010/137904
PCT Pub. Date: Dec. 2, 2010

(65) Prior Publication Data
US 2012/0077519 A1    Mar. 29, 2012

(30) Foreign Application Priority Data

May 29, 2009    (KR) ................... 10-2009-0047468

(51) Int. Cl.
*H04W 24/00* (2009.01)
*H04B 7/06* (2006.01)

(52) U.S. Cl.
CPC ............................ *H04B 7/0671* (2013.01)
USPC ................................................ 455/456.1

(58) Field of Classification Search
USPC ........ 455/456.1–456.6, 448, 553.1, 458, 561, 455/562.1; 370/328, 338
See application file for complete search history.

(56) References Cited

U.S. PATENT DOCUMENTS

| 2007/0008946 A1 | 1/2007 | Kim |
| 2009/0061892 A1* | 3/2009 | Lee et al. ................... 455/456.1 |
| 2009/0068956 A1* | 3/2009 | Naito et al. ................ 455/67.11 |
| 2010/0075693 A1 | 3/2010 | Kishigami et al. |

FOREIGN PATENT DOCUMENTS

| JP | 2008-193666 | 8/2008 |
| WO | 2005-122517 | 12/2005 |

OTHER PUBLICATIONS

International Search Report of PCT/KR2010/003395 issued on Dec. 27, 2010.

* cited by examiner

*Primary Examiner* — Brandon Miller
(74) *Attorney, Agent, or Firm* — H.C. Park & Associates, PLC (57) ABSTRACT

Disclosed are a transmitting/receiving apparatus and method using a differential cyclic delay diversity MIMO scheme.

22 Claims, 8 Drawing Sheets

TRANSMITTING AND RECEIVING APPARATUSES AND METHODS USING A DIFFERENTIAL CYCLIC DELAY DIVERSITY MIMO SCHEME

CROSS-REFERENCE TO RELATED APPLICATIONS

This application is the National Stage Entry of International Application PCT/KR2010/003395, filed on May 28, 2010, and claims priority from and the benefit of Korean Patent Application No. 10-2009-0047468, filed on May 29, 2009, both of which are incorporated herein by reference for all purposes as if fully set forth herein.

BACKGROUND

1. Field

The present invention relates to a transmitting/receiving apparatus and method using a differential cyclic diversity MIMO scheme, and more particularly to a transmitting/receiving apparatus and method, which determine whether a location of a terminal belongs to a femto cell region or a macro cell region and apply a differential cyclic delay value.

2. Discussion of the Background

An LTE (Long Term Evolution) is recently discussed as a Beyond $3^{rd}$ Generation (B3G) technology, and an LTE-Advanced, which is discussed as a technology after an LTE, also has become an issue. One of the main technologies of an LTE-Advanced which are discussed is a femto cell. The femto cell becomes an indoor base station which may be installed using an indoor internet line while playing the same role as a conventional base station. The femto cell cannot perform a cell planning unlike the conventional base station, but it may be installed or moved at user's disposal. Accordingly, it is expected that the femto cell causes a more serious problem in comparison with the conventional base station in terms of inter cell interference generated between the conventional base stations and a near-far problem. A research on a scheme for solving the problem is in active progress.

Accordingly, a method, which can reduce interference between a femto cell and a conventional macro cell, is greatly required in an environment where the femto cell and the conventional macro cell coexist.

SUMMARY

The present invention provides a transmitting/receiving apparatus and method, which can reduce inter-cell interference by determining whether a location of a terminal belongs to a femto cell region or a macro cell region to differentially apply a cyclic shift value.

The present invention provides a transmitting/receiving apparatus and method, which can analyze a signal without inter-cell signal interference by determining whether the location of the terminal belongs to the femto cell region or the macro cell region to determine a time zone of a signal to be received and receiving the signal according to the determined time zone.

In accordance with an aspect of the present invention, there is provided a transmitting apparatus including: a terminal location determiner for determining whether a current location of a terminal belongs to a micro cell region or a macro cell region; a cyclic shift value setting unit for setting one or more cyclic shift (or cyclic shift delay) values according to the location of the terminal; a delay signal generator for generating one or more delay signals according to the one or more set cyclic shift values; and a transmitter for transmitting the one or more delay signals to the terminal as one or more transmission signals.

According to an exemplary embodiment, the cyclic shift value setting unit sets a maximum value of the cyclic shift values to a first maximum value when the current location of the terminal belongs to the micro cell region, and sets the maximum value of the cyclic shift values to a second maximum value when the current location of the terminal belongs to the macro cell region, wherein the second maximum value is larger than the first maximum value.

According to an exemplary embodiment, when the current location of the terminal belongs to the femto cell, the cyclic shift value setting unit sets one or more cyclic shift values smaller than the first maximum value.

According to an exemplary embodiment, when the current location of the terminal belongs to the macro cell, the cyclic shift value setting unit sets one or more cyclic shift values larger than the first maximum value and smaller than the second maximum value.

According to an exemplary embodiment, when the transmitting apparatus uses a cyclic delay diversity-based precoding scheme, the delay signal generator generates one or more delay signals to which a phase difference according to the one or more set cyclic shift values is applied.

According to an exemplary embodiment, when the transmitting apparatus does not use a cyclic delay diversity-based precoding scheme, the delay signal generator generates one or more delay signals to which a time difference according to the one or more set cyclic shift values is applied.

In accordance with another aspect of the present invention, there is provided a receiving apparatus including: a location determiner for determining whether a current location of a terminal belongs to a micro cell region or a macro cell region; a cyclic shift value setting unit for setting a range of a cyclic shift value of a target signal to be received according to the current location of the terminal; and a receiver for receiving the target signal to be received according to the range of the cyclic delay value.

In accordance with another aspect of the present invention, there is provided a transmitting method including: determining whether a current location of a terminal belongs to a micro cell region or a macro cell region; setting one or more cyclic shift values according to the current location of the terminal; generating one or more delay signals according to the set one or more cyclic shift values; and transmitting the one or more delay signals to the terminal as one or more transmission signals.

In accordance with another aspect of the present invention, there is provided a receiving method including: determining whether a current location of a terminal belongs to a micro cell region or a macro cell region; setting a range of a cyclic shift value of a target signal to be received according to the current location of the terminal; and receiving the target signal to be received according to the range of the cyclic delay value.

According to an exemplary embodiment, receiving of the target signal to be received includes recognizing a signal reception time zone according to the range of the cyclic delay value; and receiving the target signal to be received in the signal reception time zone.

According to an embodiment of the present invention, a transmitting/receiving apparatus and method, which can reduce inter-cell interference by determining whether a location of a terminal belongs to a femto cell region or a macro cell region to differentially apply a cyclic-delay value, are provided.

According to an embodiment of the present invention, a transmitting/receiving apparatus and method, which can analyze a signal without inter-cell signal interference by determining whether the location of the terminal belongs to the femto cell region or the macro cell region to determine a time zone of a signal to be received, and receiving the signal according to the determined time zone, are provided.

DETAILED DESCRIPTION OF THE ILLUSTRATED EMBODIMENTS

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Elements, features, and structures are denoted by the same reference numerals throughout the drawings and the detailed description. A transmitting/receiving method using a differential cyclic-delay diversity MIMO scheme may be performed by elements included in a transmitting/receiving is apparatus using a differential cyclic-delay diversity MIMO scheme.

Figure 1:
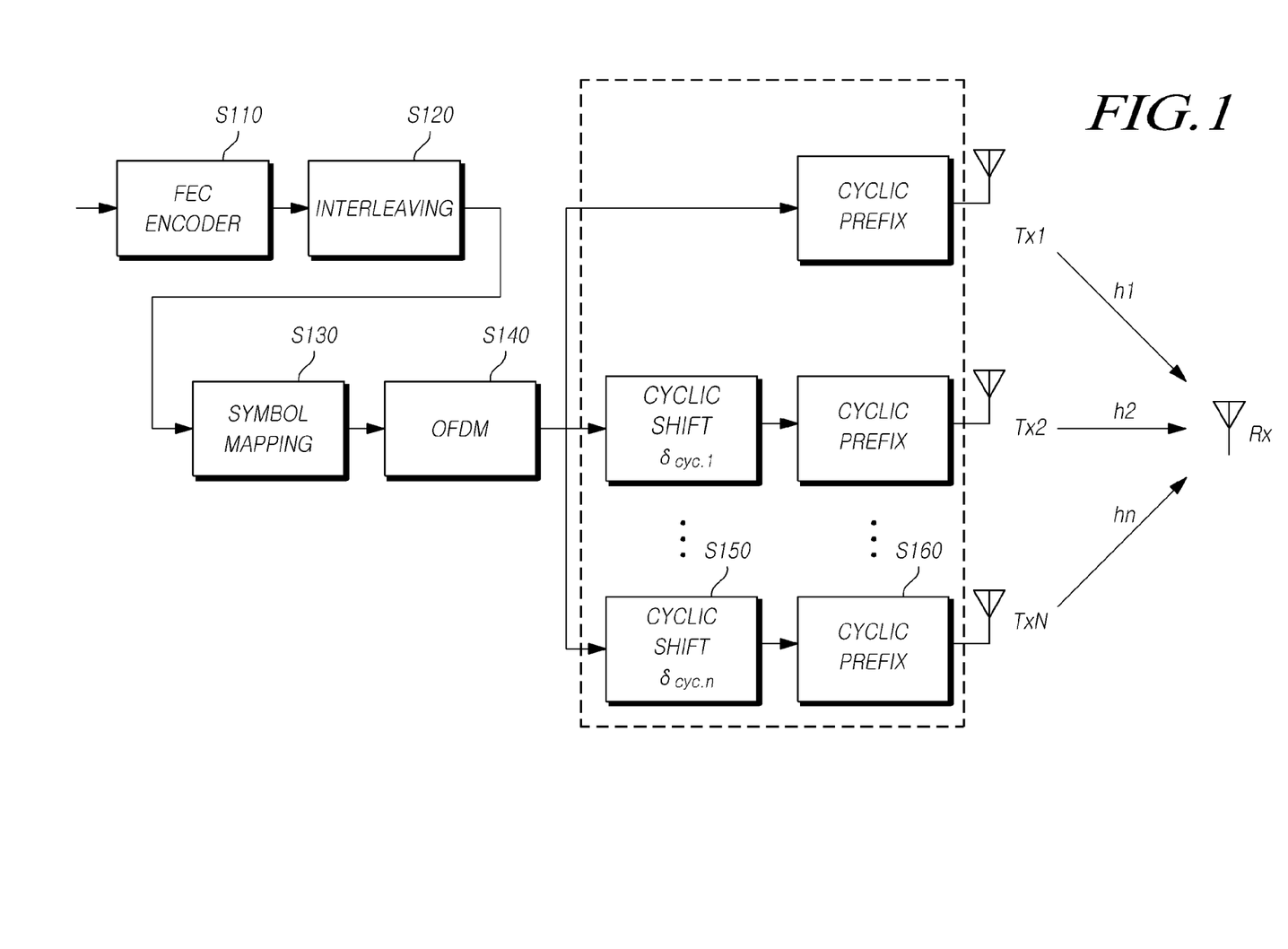
FIG. 1 illustrates a method of transmitting a signal in a MIMO-OFDM system using a conventional CDD scheme.

FIG. 1 illustrates a method of transmitting a signal in a MIMO-OFDM (Multiple-Input Multiple-Output-Orthogonal Frequency Division Multiplexing) system using a conventional CDD (Cyclic Delay Diversity) scheme.

In FIG. 1, transmission antennas, to which the N number of CDD schemes are applied, are used and a structure of an OFDM transmission terminal causing a linear delay on a time axis is illustrated.

In step S110, an information bit is encoded in an FEC encoder terminal. In step S120, information is distributed through interleaving so that the encoded information bit is changed in a stronger form for a burst error. In step S130, the information bit is symbolized through a symbol mapping. In step S140, the symbolized information is OFDM-symbolized via an IFFT (Inverse Fast Fourier Transform) terminal having a size of an NFFT (N is an integer and NFFT is a size of an PH). In step S150, OFDM-symbolized signals are cyclic-delayed. At this time, a signal transmitted to a T×1 antenna is not cyclic-delayed, and an original signal is transmitted without any change. On the other hand, a signal transmitted to an antenna after the T×1 antenna is cyclic-delayed by δcyc, n and then transmitted. Here, n refers to the number of antennas. The cyclic-delayed signals on a time axis become signals having a PD (Phase Diversity) on a frequency axis. In step S160, a CP (Cyclic Prefix) is added and then the cyclic-delayed signals are transmitted to each antenna. The transmitted signals may be defined by equation (1) and equation (2) below.

$$s(l) = \frac{1}{\sqrt{N_{FFT}}} \sum_{k=0}^{N_{FFT}-1} S(k) e^{j\frac{2\pi}{N_{FFT}}kl} \quad (1)$$

$$s((l - \delta_{cyc,n}) \bmod N_{FFT}) = \frac{1}{\sqrt{N_{FFT}}} \sum_{k=0}^{N_{FFT}-1} e^{-j\frac{2\pi}{N_{FFT}}k\delta_{cyc,n}} S(k) e^{j\frac{2\pi}{N_{FFT}}kl} \quad (2)$$

In equations (1) and (2), S(1) and S(k) denote complex signals on a time axis and a frequency axis, respectively, and k and l denote indexes on a time axis and a frequency axis, respectively.

As described above, the OFDM transmission terminal, to which the CDD scheme is applied, delays one or more signals by a predetermined delay interval to transmit the delayed one or more signals without considering whether a location of a terminal belongs to a macro cell or a micro cell (ex. a femto cell), so that inter-cell interference between a micro cell and a conventional macro cell and a near-far problem are generated. The generation of interference between the conventional macro cell and a femto cell will be described in detailed with reference to FIG. 4.

Figure 4:
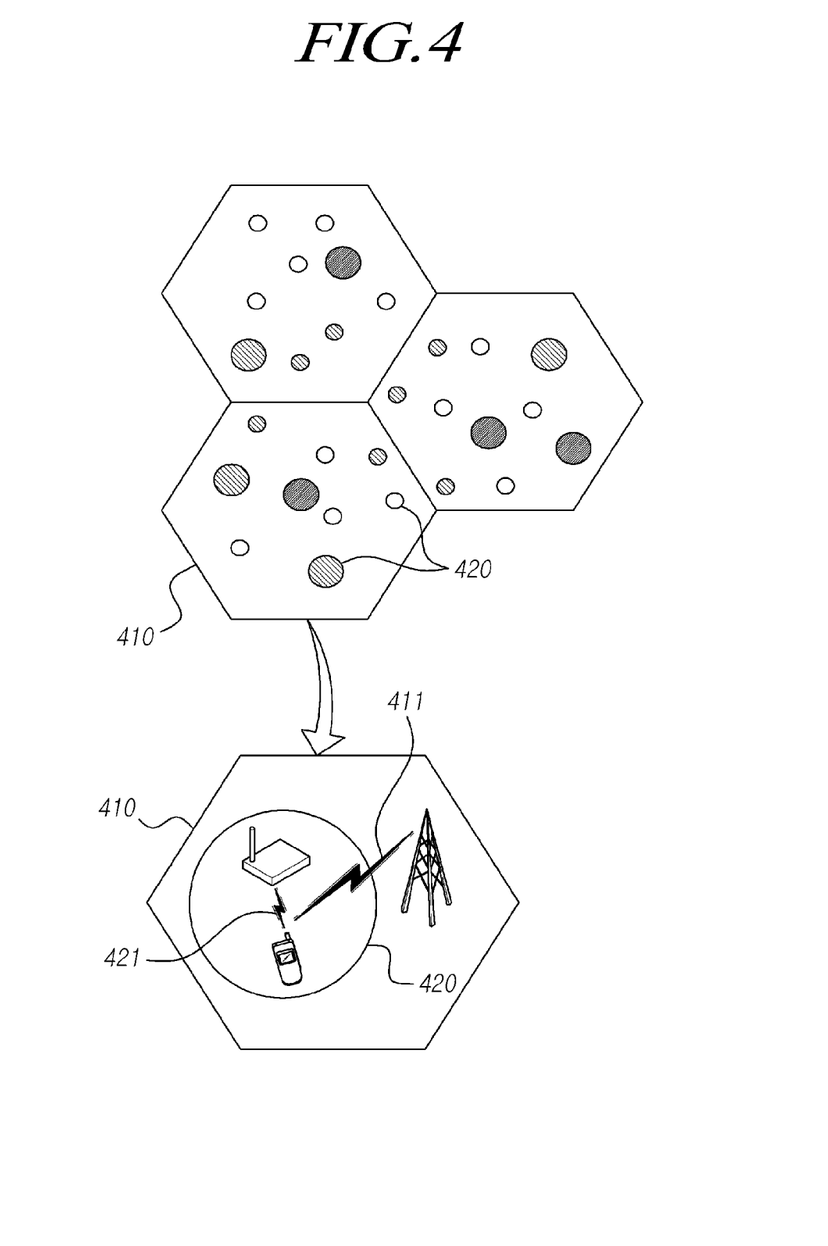
FIG. 4 is a view for describing interference generated between a macro cell and a micro cell.

FIG. 4 is a view for describing interference generated between a macro cell and a micro cell.

Referring to FIG. 4, coverage of a femto cell 420 is in a range of about 10 m, so dozens of femto cells 420 may exist within a conventional macro cell 410. Further, a femto base station operates by using an internet line installed indoor, and has an environment where a reflected wave is abundant and a delay is short since the femto cell is installed indoor, so that the environment may make it possible to maximally obtain a MIMO spatial multiplexing gain. Accordingly, a user within the femto cell 420 can use a high-speed wireless internet. However, the femto cell 420 cannot perform a cell planning unlike the conventional base station, and may have a much lager number of cell boundary areas in comparison with conventional cell boundary areas. Further, the femto cell 420 may have a more serious structure in terms of an inter-cell interference problem or a near-far problem in comparison with a conventional macro cell structure.

That is, when a terminal is located in a boundary area of the femto cell 420, interference between a signal 421 from a femto base station and a signal 411 from a macro base station may be generated.

Figure 2:
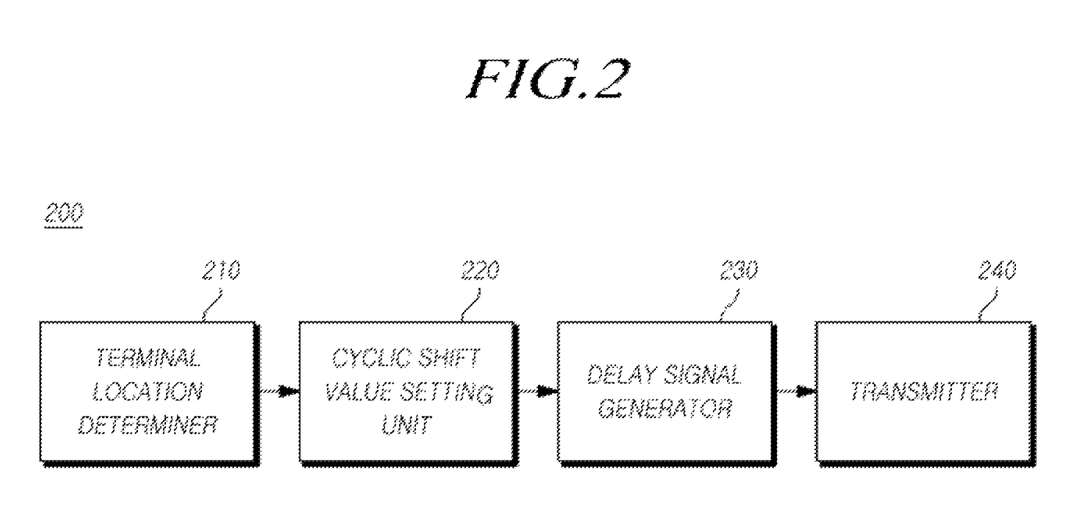
FIG. 2 is a block diagram illustrating a transmitting apparatus using a differential CDD-MIMO scheme according to an embodiment of the present invention.

FIG. 2 is a block diagram illustrating a transmitting apparatus using a differential CDD-MIMO scheme according to an embodiment of the present invention.

Referring to FIG. 2, a transmitting apparatus 200 using a differential CDD-MIMO scheme includes a terminal location determiner 210, a cyclic shift value setting unit 220, a delay signal generator 230, and a transmitter 240.

The terminal location determiner 210 can determine whether a current location of a terminal belongs to a micro cell region or a macro cell region. For example, the terminal can determine whether a cell, from which the terminal currently receives a service, is a femto cell or a conventional macro cell.

The cyclic shift value setting unit 220 can set one or more cyclic shift (cyclic shift delay) values according to the location of the terminal. That is, the cyclic shift values may be differentially set depending on whether the location of the terminal belongs to the femto cell or the macro cell. In setting the cyclic shift values according to the location of the terminal, a range of the cyclic shift values according to the location of the terminal is set, and the one or more cyclic shift values may be set within the range of the cyclic delay value. For example, when the location of the terminal belongs to the femto cell, a maximum value of the cyclic shift value is set to a first maximum value, and the cyclic shift value may be set in a range of more than 0 and smaller than the first maximum value. Further, when the location of the terminal belongs to the macro cell, the maximum value of the cyclic shift value is set to a second maximum value larger than the first maximum value, and the cyclic shift value may be set in a range of more than the first maximum value and smaller than the second maximum value. Accordingly, the cyclic shift values for the femto cell and the macro cell may be discriminately set without overlapping parts.

The delay signal generator 230 can generate one or more delay signals according to the set one or more cyclic shift values. That is, the one or more delay signals may be generated by applying the one or more cyclic shift values set within the range of the cyclic shift values. Accordingly, the delay signals for the femto cell and the macro cell may be discriminately generated since the cyclic shift values for the femto cell and the macro cell have been discriminately set, and the set discriminated cyclic shift values have been applied to generate the delay signals. Therefore, a signal which can be analyzed in the femto cell and a signal which can be analyzed in the macro cell may be easily discriminated and analyzed.

Here, when the transmitting apparatus uses a cyclic delay diversity-based precoding scheme, the delay signal generator 230 generates one or more delay signals, to which a phase difference according to the set one or more cyclic shift values is applied. When the transmitting apparatus does not use the cyclic delay diversity-based precoding scheme, the delay signal generator 230 can generate one or more delay signals, to which a time difference according to the set one or more cyclic shift values is applied.

The transmitter 240 can transmit one or more transmission signals, which are generated by adding a cyclic prefix to the one or more delay signals, to the terminal.

As described above, proper cyclic shift values are differentially applied according to a cell, from which the terminal currently receives a service, so that a transmitting/receiving apparatus and method, which can reduce inter-cell interference in a cell boundary area, may be provided.

Figure 3:
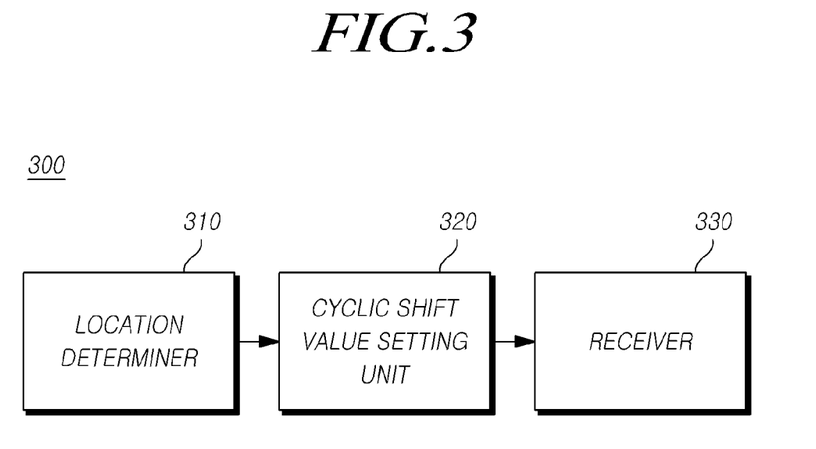
FIG. 3 is a block diagram illustrating a receiving apparatus using a differential CDD-MIMO scheme according to an embodiment of the present invention.

FIG. 3 is a block diagram illustrating a receiving apparatus using a differential CDD-MIMO scheme according to an embodiment of the present invention.

Referring to FIG. 3, a receiving apparatus 300 using a differential CDD-MEMO scheme includes a location determiner 310, a cyclic shift value setting unit 320, and a receiver 330.

The location determiner 310 can determine whether a current location belongs to a micro cell region or a macro cell region. That is, the location determiner 310 can determine whether a current location, in which a terminal receives a service, belongs to a femto cell region or the macro cell region.

The cyclic shift value setting unit 320 can set a range of a cyclic shift value of a target signal to be received according to the current location. For example, a maximum value of the cyclic shift value is set according to whether a location in which the terminal receives a service belongs to the femto cell region or the macro cell region, and the range of the cyclic shift value may be set according to the set maximum value.

The receiver 330 can receive the target signal to be received according to the range of the cyclic delay value. For example, a time zone in which the target signal to be received can be analyzed varies according to the ranges of the cyclic shift values corresponding to the femto cell and the macro cell, and a femto cell signal and a macro cell signal may be analyzed in each time zone.

As described above, by differentially applying the CDD-MIMO scheme according to a cell, from which the terminal currently receives a service, it is possible to extract the signals, which can be analyzed in the femto cell, in a far earlier time zone in comparison with the macro cell, and an analysis of a signal within the femto cell may be easily completed before fully receiving an effect of a signal of the macro cell. Further, according to an analysis in the aspect of signal power, power of a signal received from the macro cell is smaller than 1 at a time when symbol interval power of a signal received by the femto cell becomes 1. Accordingly, a transmitting/receiving apparatus, which can reduce inter-cell interference and a near-far problem, may be provided.

Figure 5:
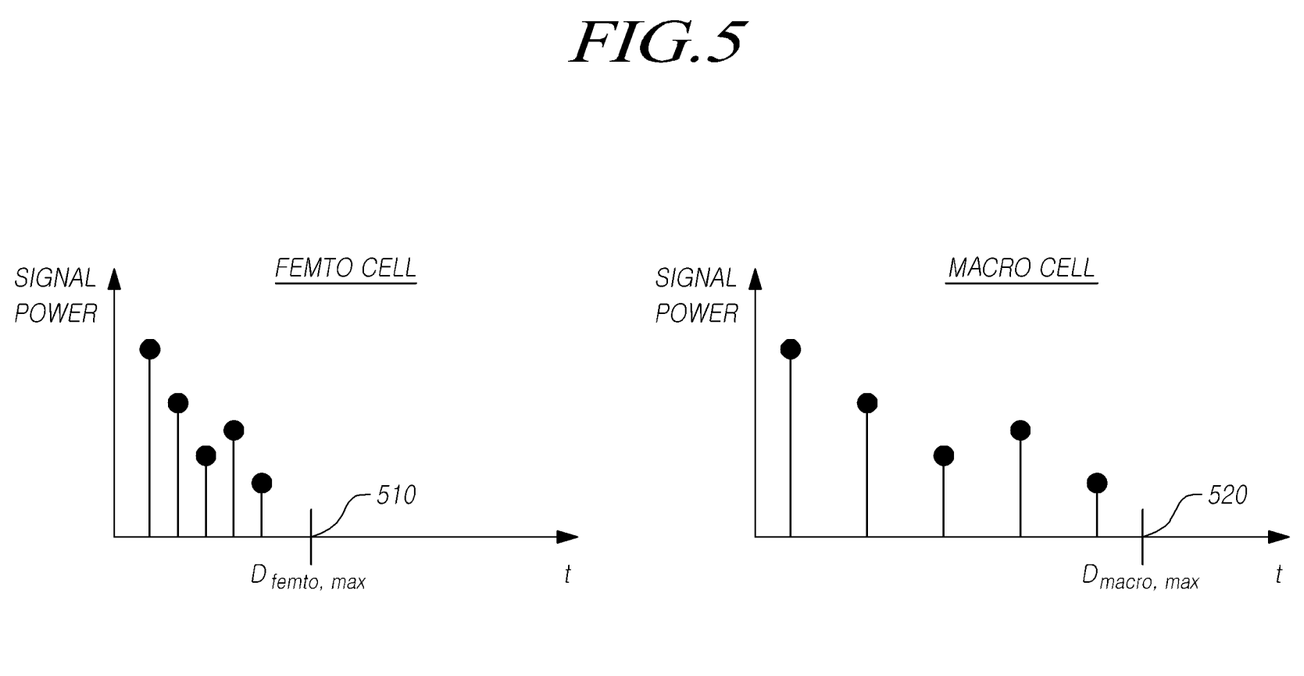
FIG. 5 is a view for describing a delay profile of a signal received by a macro cell and a micro cell according to an embodiment of the present invention.

FIG. 5 is a view for describing a delay profile of a signal received by a macro cell and a micro cell according to an embodiment of the present invention.

Referring to FIG. 5, when a delayed signal which can be analyzed in the femto cell is not larger than Dfemto, max 510 since a radius of the femto cell is within 10 m and corresponds to an environment where the femto cell is used indoor and a delayed signal which can be analyzed in the macro cell is not larger than Dmacro, max 520, Dmacro, max may have a greatly larger value than Dfemto, max. That is, as described above, Dmacro, max has a greatly large feature in comparison with Dfemto, max due to environmental and regional characteristics of the femto cell and the macro cell, and the feature may be a factor by which the differential CDD scheme may be efficiently applied to each cell.

Figure 6:
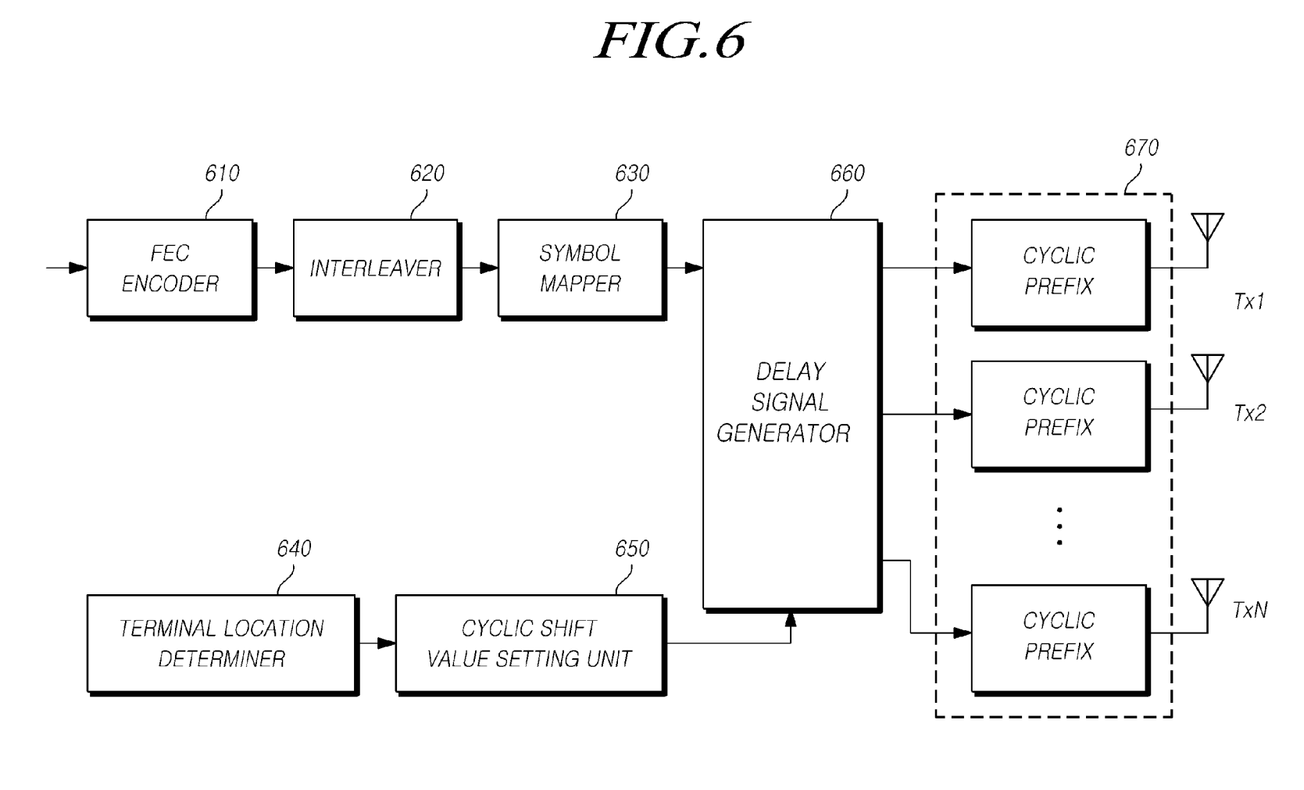
FIG. 6 is a view for describing a transmitting method using a differential CDD-MIMO scheme for each apparatus according to an embodiment of the present invention.

FIG. 6 is a view for describing a transmitting method using a differential CDD-MIMO scheme for each apparatus according to an embodiment of the present invention.

Referring to FIG. 6, information bits transmitted to a physical layer via a channel coding in a higher layer may be encoded through an FEC encoder 610, which is an encoder through which the information bits pass through in order to correct a burst error which may not be corrected in the channel coding. The information bits having passed through the encoder 610 may scatter the continuity of the information bits, which may cause the burst errors due to a channel state. Therefore, in order to efficiently distribute such burst errors, the information bits may be interleaved by an interleaver 620. Next, the information bits are transferred to an IFFT terminal after a symbol mapping process. At this time, the information bits are symbolized into QPSK, 16QAM, and 64QAM through a modulation process, and then may be mapped to the IFFT terminal by a scheduler. Further, a signal having passed through the IFFT terminal may be a signal having a version delayed by a cyclic shift value before adding a CP (Cyclic Prefix).

Here, the cyclic shift value can determine whether a cell currently receiving a service is the femto cell or the macro cell by a terminal location determiner 640. Further, a cyclic shift value setting unit 650 can differentially set a corresponding cyclic shift value according to the femto cell or the macro cell. A delay signal generator 660 can generate one or more delay signals by applying the set cyclic delay value. A transmitter 670 can transmit one or more signals, which are generated by adding a cyclic prefix to the one or more delay signals, to the terminal.

Figure 7:
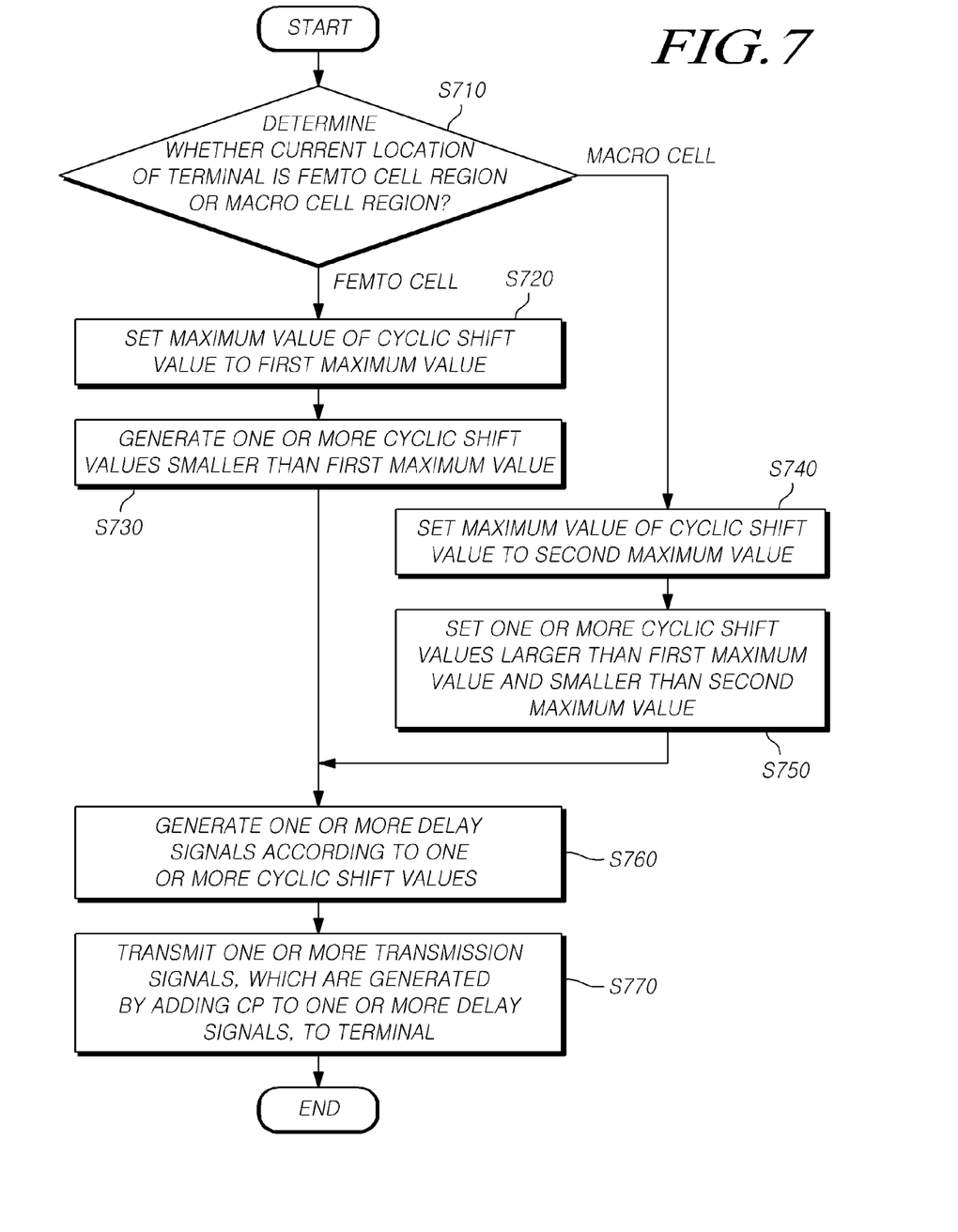
FIG. 7 is a flowchart illustrating a transmitting method using a differential CDD-MIMO scheme according to an embodiment of the present invention.

FIG. 7 is a flowchart illustrating a transmitting method using a differential CDD-MIMO scheme according to an embodiment of the present invention.

Referring to FIG. 7, in step S710, it may be determined whether a current location of a terminal belongs to the femto cell region or the macro cell region.

In step S720, when the current location of the terminal belongs to the femto cell region, a maximum value of the cyclic shift value may be set to a first maximum value. Here, the first maximum value may be at least one of a pre-stored value and a measured value based on environment information of the femto cell.

In step S730, one or more cyclic shift values may be set in a range of larger than 0 and smaller than the set first maximum value. For example, one or more cyclic shift values ($\delta$cyc, femto, 1, $\delta$cyc, femto, 2, . . . , $\delta$cyc, femto, n−1,) may be set in a range of smaller than the first maximum value, where n may be the number of antennas.

In step S740, when the current location of the terminal belongs to the macro cell, the maximum value of the cyclic shift value may be set to a second maximum value. Here, the second maximum value may be also at least one of a pre-stored value and a measured value based on environment information of the macro cell.

In step S750, one or more cyclic shift values may be set in a range of larger than the first maximum value and smaller than the second maximum value. Here, the second maximum value may be set to a value larger than the first maximum value. For example, one or more cyclic shift values ($\delta$cyc, macro, 1, $\delta$cyc, macro, 2, . . . , $\delta$cyc, macro, n−1) may be set in a range of larger than the first maximum value and smaller than the second maximum value, where n may be the number of antennas.

In step S760, one or more delay signals may be generated according to the one or more cyclic shift values.

In step S770, one or more transmission signals, which are generated by adding a cyclic prefix to the one or more delay signals, may be transmitted to the terminal.

Figure 8:
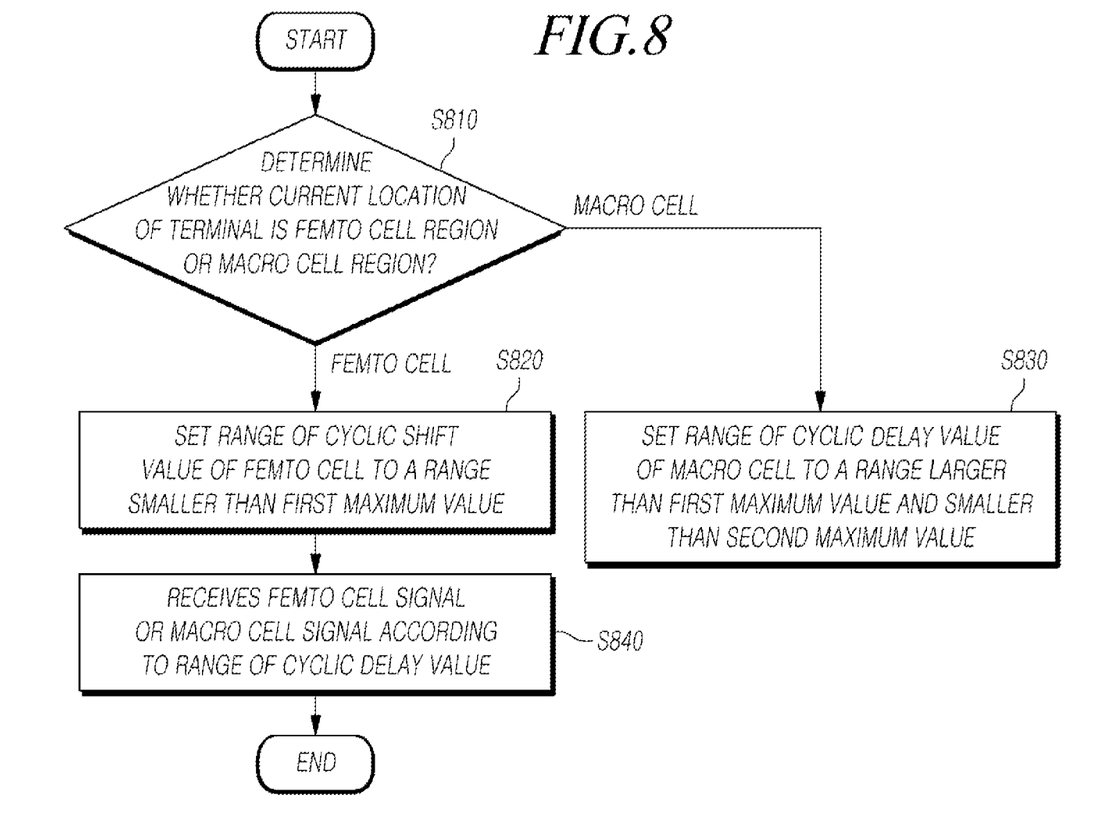
FIG. 8 is a flowchart illustrating a receiving method using a differential CDD-MIMO scheme according to an embodiment of the present invention.

FIG. 8 is a flowchart illustrating a receiving method using a differential CDD-MIMO scheme according to an embodiment of the present invention.

Referring to FIG. 8, in step S810, it may be determined whether a current location of a terminal belongs to the femto cell region or the macro cell region.

In step S820, when the current location of the terminal belongs to the femto cell region, a range of the cyclic shift value of the femto cell may be set to a range of smaller than a first maximum value.

In step S830, when the current location of the terminal belongs to the macro cell region, the range of the cyclic shift value of the macro cell may be set to a range of larger than the first maximum value and smaller than a second maximum value. Here, the second maximum value may be set to a value larger than the first maximum value.

In step S840, a femto cell signal or a macro cell signal may be received according to the range of the cyclic delay value. At this time, step S840 may include a step of recognizing a signal reception time zone according to the range of the cyclic delay value, and a step of receiving the target signal to be received in the signal reception time zone. For example, when one or more cyclic shift values are set in a range of smaller than the first to maximum value and one or more delay signals are generated and transmitted for the femto cell, and one or more cyclic shift values are set in a range of larger than the first maximum value and smaller than the second maximum value (here, the second maximum value is greatly larger than the first maximum value) and one or more delay signals are generated and transmitted for macro cell, signals which can be analyzed in the femto cell may be extracted in a far earlier time than a signal which can be analyzed in the macro cell.

In the above description, the femto cell is an embodiment of the macro cell, and the present invention may be applied to all macro cells other than the femto cell.

Accordingly, a transmitting/receiving apparatus, which can reduce inter-cell interference and a near-far problem, may be provided.

Meanwhile, parts, which have not been described in FIGS. 7 and 8, may be understood with reference to the descriptions of FIGS. 1 to 6.

As described above, the transmitting/receiving apparatus and method, which can reduce inter-cell interference and a near-far problem by determining whether the location of the terminal belongs to the micro cell region or the macro cell region to differentially apply the cyclic delay value, may be provided.

Further, the transmitting/receiving apparatus and method, which can analyze a signal without inter-cell signal interference by determining whether the location of the terminal belongs to the micro cell region or the macro cell region to determine a time zone of a signal to be received and receiving the signal according to the determined time zone, may be provided.

By determining whether the location of the terminal belongs to the micro cell region or the macro cell region, the cyclic shift value may be differentially applied. Alternatively, the CDD scheme may not be applied by setting the cyclic shift value to "0" in the micro cell region, and the CDD scheme may be applied by setting the cyclic shift value only in the macro cell region, or an inverse manner may be applied.

Further, a transmitting/receiving method using a differential CDD-MIMO scheme according to an embodiment of the present invention includes a computer readable medium including a program for performing an operation implemented by various computers. The computer readable medium may individually or integratively include a program command, a data file, and a data structure. The program command of the medium may be specially designed and constructed for the present invention, or may be available because it has been known to those skilled in computer software. For example, the computer readable recoding medium includes magnetic media such as a hard disk, a floppy disk, and a magnetic tape, optical media such as a CD-ROM and a DVD, magneto-optical media such as a floptical disk, and hardware devices such as a ROM, RAM, and a flash memory, which are specially constructed in such a manner that they can store and execute a program command. For example, the program command includes a high level language code, which may be executed by a computer by using an interpreter, as well as a machine language code made by a compiler.

While the exemplary embodiments have been shown and described, it will be understood by those skilled in the art that various changes in form and details may be made thereto without departing from the spirit and scope of this disclosure as defined by the appended claims and their equivalents. Thus, as long as modifications fall within the scope of the appended claims and their equivalents, they should not be misconstrued as a departure from the scope of the invention itself.

What is claimed is:

1. A transmitting apparatus comprising:
 a terminal location determiner for determining whether a current location of a terminal belongs to a micro cell region or a macro cell region;
 a cyclic shift value setting unit for setting one or more cyclic shift values according to the location of the terminal;
 a delay signal generator for generating one or more delay signals according to the one or more set cyclic shift values; and
 a transmitter for transmitting the one or more delay signals to the terminal as one or more transmission signals.

2. The transmitting apparatus as claimed in claim 1, wherein the cyclic shift value setting unit sets a maximum value of the cyclic shift values to a first maximum value when the current location of the terminal belongs to the micro cell region, and sets the maximum value of the cyclic shift values to a second maximum value when the current location of the terminal belongs to the macro cell region, wherein the second maximum value is larger than the first maximum value.

3. The transmitting apparatus as claimed in claim 2, wherein the first maximum value and the second maximum value are set to one of a pre-stored value and a measured value based on environment information of the micro cell and the macro cell.

4. The transmitting apparatus as claimed in claim 2, wherein, when the current location of the terminal belongs to the micro cell, the cyclic shift value setting unit sets one or more cyclic shift values smaller than the first maximum value.

5. The transmitting apparatus as claimed in claim 2, wherein, when the current location of the terminal belongs to the macro cell, the cyclic shift value setting unit sets one or more cyclic shift values larger than the first maximum value and smaller than the second maximum value.

6. The transmitting apparatus as claimed in claim 1, wherein, when the transmitting apparatus uses a cyclic delay diversity-based precoding scheme, the delay signal generator generates one or more delay signals to which a phase difference according to the one or more set cyclic shift values is applied.

7. The transmitting apparatus as claimed in claim 1, wherein, when the transmitting apparatus does not use a cyclic delay diversity-based precoding scheme, the delay signal generator generates one or more delay signals to which a time difference according to the one or more set cyclic shift values is applied.

8. A receiving apparatus comprising:
 a location determiner for determining whether a current location of a terminal belongs to a micro cell region or a macro cell region;
 a cyclic shift value setting unit for setting a range of a cyclic shift value of a target signal to be received according to the current location of the terminal; and
 a receiver for receiving the target signal to be received according to the range of the cyclic shift value.

9. The receiving apparatus as claimed in claim 8, wherein the cyclic shift value setting unit sets a maximum value of the cyclic shift value to a first maximum value and a range smaller than the first maximum value to the range of the cyclic shift value when the current location of the terminal belongs to the micro cell region, and sets the maximum value of the cyclic shift value to a second maximum value and a range larger than the first maximum value and smaller than the second maximum value to the range of the cyclic shift value when the current location of the terminal belongs to the macro cell region, wherein the second maximum value is larger than the first maximum value.

10. The receiving apparatus as claimed in claim 9, wherein the first maximum value and the second maximum value are set to one of a pre-stored value and a measured value based on environment information of the micro cell and the macro cell.

11. The receiving apparatus as claimed in claim 9, wherein the receiver recognizes a signal reception time zone according to the range of the cyclic shift value, and receives the target signal to be received in the signal reception time zone.

12. A transmitting method comprising:
 determining whether a current location of a terminal belongs to a micro cell region or a macro cell region;
 setting one or more cyclic shift values according to the current location of the terminal;
 generating one or more delay signals according to the set one or more cyclic shift values ; and
 transmitting the one or more delay signals to the terminal as one or more transmission signals.

13. The transmitting method as claimed in claim 12, wherein setting of the cyclic shift values comprises:
 setting a maximum value of the cyclic shift values to a first maximum value when the current location of the terminal belongs to the micro cell region; and
 setting the maximum value of the cyclic shift values to a second maximum value when the current location of the terminal belongs to the macro cell region,
 wherein the second maximum value is larger than the first maximum value.

14. The transmitting method as claimed in claim 13, wherein the first maximum value and the second maximum value are set to one of a pre-stored value and a measured value based on environment information of the micro cell and the macro cell.

15. The transmitting method as claimed in claim 13, wherein, in setting of the cyclic shift values , one or more cyclic shift values smaller than the first maximum value are set when the current location of the terminal belongs to the micro cell region.

16. The transmitting method as claimed in claim 13, wherein, in setting of the cyclic shift values , one or more cyclic shift values larger than the first maximum value and smaller than the second maximum value are set when the current location of the terminal belongs to the macro cell region.

17. The transmitting method as claimed in claim 12, wherein, in generating of the delay signals, one or more delay signals, to which a phase difference according to the one or more set cyclic shift values is applied, are generated when a transmitting apparatus uses a cyclic delay diversity-based precoding scheme.

18. The transmitting method as claimed in claim 12, wherein, in generating of the delay signals, one or more delay signals, to which a time difference according to the one or more set cyclic shift values is applied, are generated when a transmitting apparatus does not use a cyclic delay diversity-based precoding scheme.

19. A receiving method comprising:
 determining whether a current location of a terminal belongs to a micro cell region or a macro cell region;
 setting a range of a cyclic shift value of a target signal to be received according to the current location of the terminal; and
 receiving the target signal to be received according to the range of the cyclic shift value.

20. The receiving method as claimed in claim 19, wherein setting of the range of the cyclic shift value comprises:
- setting a maximum value of the cyclic shift value to a first maximum value and a range smaller than a first maximum value to the range of the cyclic shift value when the current location of the terminal belongs to the micro cell region; and
- setting the maximum value of the cyclic shift value to a second maximum value and a range larger than the first maximum value and smaller than a second maximum value to the range of the cyclic shift value when the current location of the terminal belongs to the macro cell region,
- wherein the second maximum value is larger than the first maximum value.

21. The receiving method as claimed in claim 19, wherein the first maximum value and the second maximum value are set to one of a pre-stored value and a measured value based on environment information of the micro cell and the macro cell.

22. The receiving method as claimed in claim 19, wherein receiving of the target signal to be received comprises:
- recognizing a signal reception time zone according to the range of the cyclic shift value; and
- receiving the target signal to be received in the signal reception time zone.

* * * * *